United States Patent
Handelsman

(10) Patent No.: US 7,017,523 B2
(45) Date of Patent: Mar. 28, 2006

(54) PET CHEWS AND METHODS OF PROVIDING DENTAL CARE TO PETS

(75) Inventor: Simon Handelsman, Secaucus, NJ (US)

(73) Assignee: The Hartz Mountain Corporation, Secaucus, NJ (US)

(*) Notice: Subject to any disclaimer, the term of this patent is extended or adjusted under 35 U.S.C. 154(b) by 117 days.

(21) Appl. No.: 10/647,660

(22) Filed: Aug. 25, 2003

(65) Prior Publication Data
US 2004/0216693 A1 Nov. 4, 2004

Related U.S. Application Data

(60) Provisional application No. 60/467,278, filed on May 1, 2003.

(51) Int. Cl.
*A01K 29/00* (2006.01)

(52) U.S. Cl. .................................................. 119/707

(58) Field of Classification Search ........ 119/707–711, 119/712, 600, 664, 420, 611–615, 702; D30/160; 446/236, 486; D4/119, 120, 130, 133, 135–137; 15/159.1, 188, 207.2; 30/28
See application file for complete search history.

(56) References Cited

U.S. PATENT DOCUMENTS

| | | |
|---|---|---|
| 2,103,083 A | 12/1937 | Lynch |
| 4,145,447 A | 3/1979 | Fisher |
| 4,146,978 A * | 4/1979 | Breslow .................. 434/174 |
| 4,802,444 A | 2/1989 | Markham et al. |
| 4,825,812 A | 5/1989 | Visalli et al. |
| D307,339 S * | 4/1990 | Markham et al. .......... D30/160 |
| D308,122 S | 5/1990 | Markham et al. |
| 5,022,345 A * | 6/1991 | Bolivar et al. ............... 119/708 |
| 5,186,124 A | 2/1993 | Woodford |
| RE34,352 E | 8/1993 | Markham et al. |
| 5,263,436 A | 11/1993 | Axelrod |
| 5,329,881 A | 7/1994 | O∝Rourke |
| 5,342,398 A | 8/1994 | Sun |
| D357,952 S * | 5/1995 | Chen ........................ D21/684 |
| 5,647,302 A | 7/1997 | Shipp |

(Continued)

FOREIGN PATENT DOCUMENTS

WO  WO93/02551  *  2/1993

*Primary Examiner*—Son T. Nguyen
(74) *Attorney, Agent, or Firm*—Jeffrey M. Kaden; Gottlieb, Rackman & Reisman, P.C.

(57) ABSTRACT

One embodiment of the present invention relates to a pet chew, comprising: a first member; a second member; means for mounting the first member and the second member in a rotatable orientation, wherein the first member and the second member are rotatable relative to one another around an axis of rotation; a plurality of scrubbing elements mounted on a first surface of the first member; and a plurality of scrubbing elements mounted on a first surface of the second member; wherein the first surface of the first member and the first surface of the second member are generally perpendicular to the axis of rotation. Another embodiment of the present invention relates to a pet chew, comprising: a plurality of circular disks, wherein each of the disks includes an obverse surface, a reverse surface, and an outer circumferential surface; means for mounting the disks in a rotatable orientation, wherein the disks are rotatable relative to one another around an axis of rotation; and a plurality of scrubbing elements mounted on at least one of the obverse surface and the reverse surface of each disk. Methods of providing dental care to a pet are also disclosed.

30 Claims, 4 Drawing Sheets

U.S. PATENT DOCUMENTS

| | | | |
|---|---|---|---|
| 5,916,006 A * | 6/1999 | Ganson | 446/85 |
| 5,961,406 A * | 10/1999 | Hass | 473/576 |
| D417,319 S * | 11/1999 | Weiss, Jr. | D30/160 |
| 6,112,703 A * | 9/2000 | Handelsman | 119/707 |
| 6,116,191 A | 9/2000 | Suchowski et al. | |
| 6,148,771 A | 11/2000 | Costello | |
| 6,217,408 B1 | 4/2001 | Willinger | |
| 6,305,326 B1 | 10/2001 | Suchowski et al. | |
| D453,242 S * | 1/2002 | Kaplan | D30/160 |
| 6,365,133 B1 | 4/2002 | Rich | |
| 6,405,681 B1 | 6/2002 | Ward | |
| 6,415,741 B1 | 7/2002 | Suchowski et al. | |
| 6,439,166 B1 | 8/2002 | Markham | |
| 6,470,830 B1 * | 10/2002 | Mann | 119/709 |
| 6,474,268 B1 | 11/2002 | Suchowski et al. | |
| D473,683 S * | 4/2003 | Willinger | D30/160 |
| 6,601,539 B1 * | 8/2003 | Snook | 119/710 |
| 6,623,328 B1 * | 9/2003 | Theel | 446/369 |
| 6,688,258 B1 * | 2/2004 | Kolesar | 119/710 |
| D497,457 S * | 10/2004 | Willinger | D30/160 |

* cited by examiner

US 7,017,523 B2

PET CHEWS AND METHODS OF PROVIDING DENTAL CARE TO PETS

This application claims priority benefit of provisional application No. 60/467,278, filed May 1, 2003.

FIELD OF THE INVENTION

One embodiment of the present invention relates to a pet chew, comprising: a first member; a second member; means for mounting the first member and the second member in a rotatable orientation, wherein the first member and the second member are rotatable relative to one another around an axis of rotation; a plurality of scrubbing elements mounted on a first surface of the first member; and a plurality of scrubbing elements mounted on a first surface of the second member; wherein the first surface of the first member and the first surface of the second member are generally perpendicular to the axis of rotation.

Another embodiment of the present invention relates to a pet chew, comprising: a plurality of circular disks, wherein each of the disks includes an obverse surface, a reverse surface, and an outer circumferential surface; means for mounting the disks in a rotatable orientation, wherein the disks are rotatable relative to one another around an axis of rotation; and a plurality of scrubbing elements mounted on at least one of the obverse surface and the reverse surface of each disk.

For the purposes of the present application the term "pet" is intended to refer to any desired animal (including, but not limited to, a domesticated animal (such as a dog or a cat)).

Further, for the purposes of the present application the term "pet chew" is intended to refer to a chew object for a pet.

BACKGROUND OF THE INVENTION

Animal chews (e.g., for a dog or cat) have been used to provide the animal an outlet for its natural chewing urge and/or to aid in cleaning the teeth of the animal. Such chews have conventionally been constructed in various forms (e.g., bone-shaped (or dumbbell-shaped), rope-like, cloth-like) using: (a) a synthetic material (e.g., vinyl, plastic, polyurethane, latex, nylon; an abrasive material); (b) a plant by-product (e.g., rubber); or (c) an animal by-product (e.g., rawhide).

Examples of such conventional chews include: (a) U.S. Pat. No. Des. 308,122 to Markham, et al. (pet toy); (b) U.S. Pat. No. 2,103,083 to Lynch (teeth cleaning and gum massaging device); (c) U.S. Pat. No. 4,802,444 to Markham, et al. (therapeutic pet toy); (d) U.S. Pat. No. Re. 34,352 to Markham, et al. (therapeutic pet toy); (e) U.S. Pat. No. 4,825,812 to Visalli, et al. (horse pacifier); (f) U.S. Pat. No. 5,263,436 to Axelrod (bone-shaped therapeutic device for dogs); (g) U.S. Pat. No. 5,647,302 to Shipp (animal dental hygiene device); (h) U.S. Pat. No. 6,148,771 to Costello (chew article for animals promoting dental health/gingival health); (i) U.S. Pat. No. 6,217,408 to Willinger (self righting pet toy); (j) U.S. Pat. No. 6,439,166 to Markham (animal toy with raised features); and (k) U.S. Pat. No. 6,474,268 to Suchowski, et al. (composite chew toy).

BRIEF DESCRIPTION OF THE DRAWINGS

FIG. 3 shows an end view of End Cap 103a.

FIG. 8 shows an end view of End Cap 603a.

Among those benefits and improvements that have been disclosed, other objects and advantages of this invention will become apparent from the following description taken in conjunction with the accompanying figures. The figures constitute a part of this specification and include illustrative embodiments of the present invention and illustrate various objects and features thereof.

DETAILED DESCRIPTION OF THE INVENTION

As required, detailed embodiments of the present invention are disclosed herein; however, it is to be understood that the disclosed embodiments are merely illustrative of the invention that may be embodied in various forms. In addition, each of the examples given in connection with the various embodiments of the invention are intended to be illustrative, and not restrictive. The figures are not necessarily to scale, some features may be exaggerated to show details of particular components. Therefore, specific structural and functional details disclosed herein are not to be interpreted as limiting, but merely as a basis for the claims and as a representative basis for teaching one skilled in the art to variously employ the present invention.

In summary, in one embodiment of the present invention a pet chew may be constructed of a plurality of circular disks with protruding scrubbing elements, wherein the disks are rotatable relative to one another around an axis of rotation.

Figure 1:
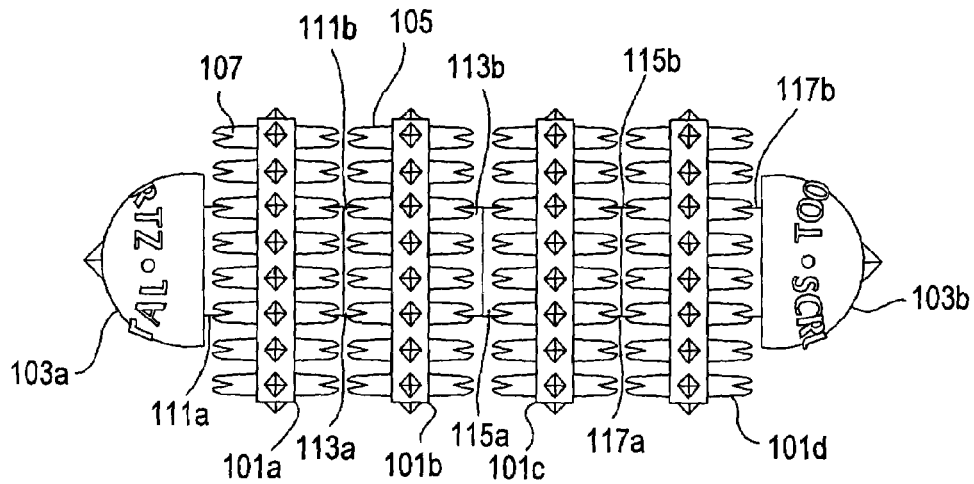
FIG. 1 shows a side view of a four-disk pet chew according to one embodiment of the present invention.

Referring now to FIG. 1, a side view of a four-disk pet chew according to one embodiment of the present invention is shown. As seen in this FIG. 1, Disk 101a, Disk 101b, Disk 101c, and Disk 101d are mounted rotatably relative to one another on a shaft (not shown). End Cap 103a and End Cap 103b are used to retain Disk 101a, Disk 101b, Disk 101c, and Disk 101d on the shaft.

Still referring to FIG. 1, a plurality of Scrubbing Nubs 105 (only one of which is individually identified in FIG. 1) protrude from each face (i.e., obverse surface and reverse surface) of each of Disk 101a, Disk 101b, Disk 101c, and Disk 101*d*. In addition, Scrubbing Tips 107 (only one of which is individually identified in FIG. 1) protrude from each Scrubbing Nub 105.

Further, Disk 101*a* has Hub 111*a* formed on one face and Hub 111*b* formed on the other face. Likewise, Disk 101*b* has Hub 113*a* formed on one face and Hub 113*b* formed on the other face; Disk 101*c* has Hub 115*a* formed on one face and Hub 115*b* formed on the other face; and Disk 101*d* has Hub 117*a* formed on one face and Hub 117*b* formed on the other face. In one example (which example is intended to be illustrative and not restrictive), each of the End Caps, Hubs, Disks, Scrubbing Nubs and Scrubbing Tips may be sized to provide the spacing identified below in Table I:

TABLE I

| Location | Spacing |
| --- | --- |
| Between the inside of End Cap 103a and the outside Scrubbing Tips of Disk 101a | 1/32 inch |
| Between the inside Scrubbing Tips of Disk 101a and the outside Scrubbing Tips of Disk 101b | 1/16 inch |
| Between the inside Scrubbing Tips of Disk 101b and the inside Scrubbing Tips of Disk 101c | 1/8 inch |
| Between the outside Scrubbing Tips of Disk 101c and the inside Scrubbing Tips of Disk 101d | 1/16 inch |
| Between the inside of End Cap 103b and the outside Scrubbing Tips of Disk 101d | 1/32 inch |

Figure 2:
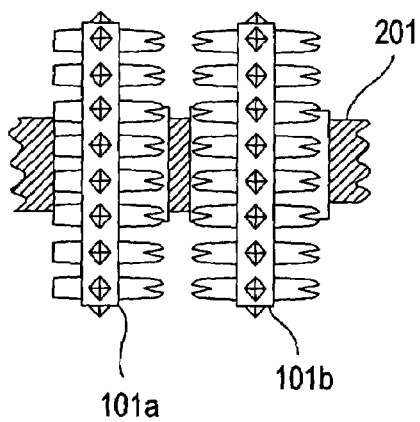
FIG. 2 shows an exploded side view of Disk 101a and Disk 101b of FIG. 1.

Referring now to FIG. 2, an exploded side view of Disk 101*a* and Disk 101*b* of FIG. 1 is shown. As seen in this FIG. 2, Disk 101*a* and Disk 101*b* (as well as the other Disks, not shown) are arranged on Shaft 201.

Figure 3:
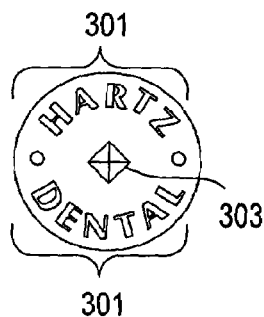

Referring now to FIG. 3, an end view of End Cap 103*a* is shown. In one example (which example is intended to be illustrative and not restrictive), End Cap 103*a* may include Raised Portion 301, which may comprise marketing and/or other indicia. In another example (which example is intended to be illustrative and not restrictive), End Cap 103*a* may include Protrusion 303 which may be adapted for cleaning teeth and/or gums.

Figure 4:
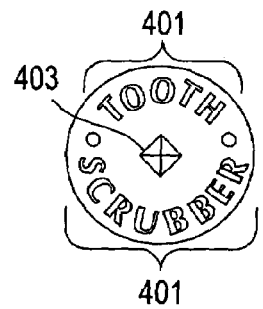
FIG. 4 shows an end view of End Cap 103b.

Referring now to FIG. 4, an end view of End Cap 103*b* is shown. In one example (which example is intended to be illustrative and not restrictive), End Cap 103*b* may include Raised Portion 401, which may comprise marketing and/or other indicia. In another example (which example is intended to be illustrative and not restrictive), End Cap 103*b* may include Protrusion 403 which may be adapted for cleaning teeth and/or gums.

Figure 5:
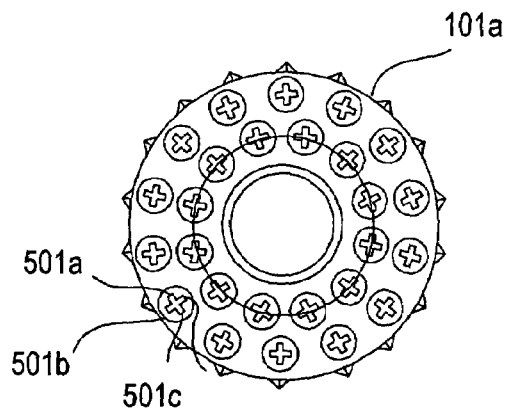
FIG. 5 shows an end view of Disk 101a (depicting one face)

Referring now to FIG. 5, an end view of Disk 101*a* (depicting one face) is shown: As seen in this FIG. 5, the Scrubbing Nubs (including associated Scrubbing Tips) may be arranged in rows. In one example (which example is intended to be illustrative and not restrictive), there may be two rows arranged in an offset pattern. Of course, the other face of Disk 101*a* (as well as the faces of the other Disks) may have similarly arranged Scrubbing Nubs and Scrubbing Tips. In another example (which example is intended to be illustrative and not restrictive), each of Scrubbing Nubs 105 may include four Scrubbing Tips 501*a*, 501*b*, 501*c*, and 501*d* (of note, only one set of Scrubbing Tips 501*a*–501*d* is individually identified in FIG. 5).

Figure 6:
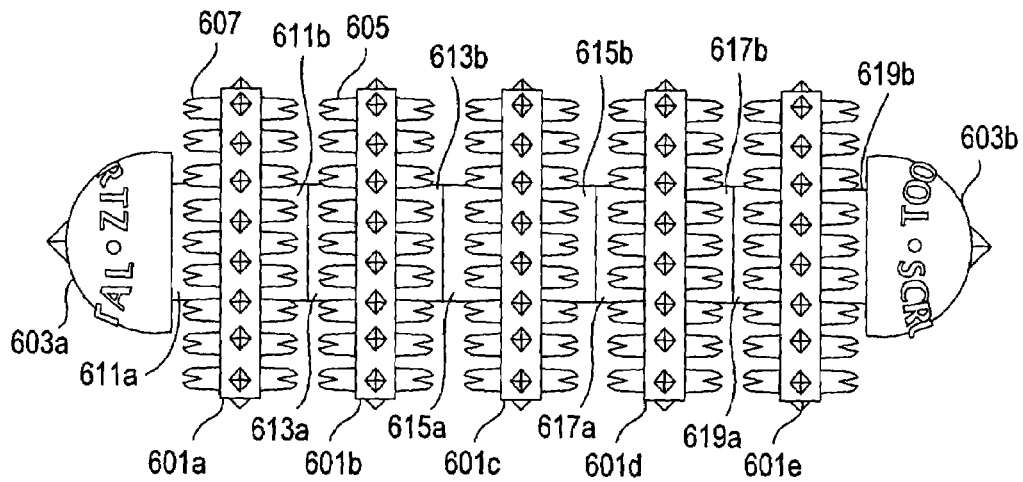
FIG. 6 shows a side view of a five-disk pet chew according to one embodiment of the present invention.

Referring now to FIG. 6, a side view of a five-disk pet chew according to one embodiment of the present invention is shown. As seen in this FIG. 6, Disk 601*a*, Disk 601*b*, Disk 601*c*, Disk 601*d*, and Disk 601*e* are mounted rotatably relative to one another on a shaft (not shown). End Cap 603*a* and End Cap 603*b* are used to retain Disk 601*a*, Disk 601*b*, Disk 601*c*, Disk 601*d*, and Disk 601*e* on the shaft.

Still referring to FIG. 6, a plurality of Scrubbing Nubs 605 (only one of which is individually identified in FIG. 6) protrude from each face (i.e., obverse surface and reverse surface) of each of Disk 601*a*, Disk 601*b*, Disk 601*c*, Disk 601*d*, and Disk 601*e*. In addition, Scrubbing Tips 607 (only one of which is individually identified in FIG. 6) protrude from each Scrubbing Nub 605. Further, Disk 601*a* has Hub 611*a* formed on one face and Hub 611*b* formed on the other face. Likewise, Disk 601*b* has Hub 613*a* formed on one face and Hub 613*b* formed on the other face; Disk 601*c* has Hub 615*a* formed on one face and Hub 615*b* formed on the other face; Disk 601*d* has Hub 617*a* formed on one face and Hub 617*b* formed on the other face; and Disk 601*e* has Hub 619*a* formed on one face and Hub 619*b* formed on the other face. In one example (which example is intended to be illustrative and not restrictive), each of the End Caps, Hubs, Disks, Scrubbing Nubs and Scrubbing Tips may be sized to provide the spacing identified below in Table II:

TABLE II

| Location | Spacing |
| --- | --- |
| Between the inside of End Cap 603a and the outside Scrubbing Tips of Disk 601a | 1/16 inch |
| Between the inside Scrubbing Tips of Disk 601a and the outside Scrubbing Tips of Disk 601b | 1/8 inch |
| Between the inside Scrubbing Tips of Disk 601b and the left side Scrubbing Tips of Disk 601c | 3/16 inch |
| Between the right side Scrubbing Tips of Disk 601c and the inside Scrubbing Tips of Disk 601d | 3/16 inch |
| Between the outside Scrubbing Tips of Disk 601d and the inside Scrubbing Tips of Disk 601e | 1/8 inch |
| Between the inside of End Cap 603b and the outside Scrubbing Tips of Disk 601e | 1/16 inch |

Figure 7:
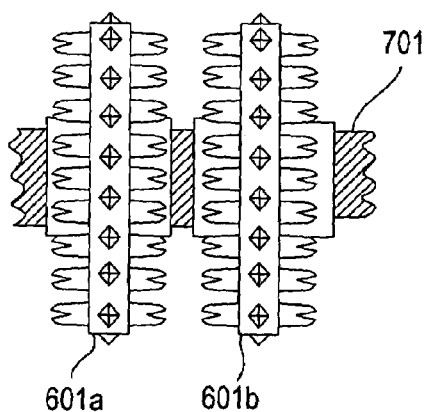
FIG. 7 shows an exploded side view of Disk 601a and Disk 601b of FIG. 6.

Referring now to FIG. 7, an exploded side view of Disk 601*a* and Disk 601*b* of FIG. 6 is shown. As seen in this FIG. 6, Disk 601*a* and Disk 601*b* (as well as the other Disks, not shown) are arranged on Shaft 611.

Figure 8:
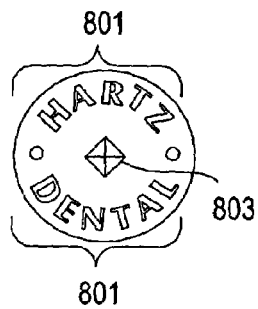

Referring now to FIG. 8, an end view of End Cap 603*a* is shown. In one example. (which example is intended to be illustrative and not restrictive), End Cap 603*a* may include Raised Portion 801, which may comprise marketing and/or other indicia. In another example (which example is intended to be illustrative and not restrictive), End Cap 603*a* may include Protrusion 803 which may be adapted for cleaning teeth and/or gums.

Figure 9:
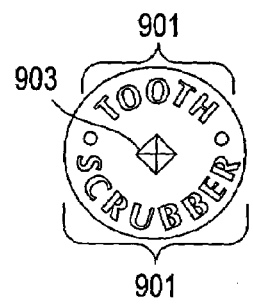
FIG. 9 shows an end view of End Cap 603b.

Referring now to FIG. 9, an end view of End Cap 603*b* is shown. In one example (which example is intended to be illustrative and not restrictive), End Cap 603*b* may include Raised Portion 901, which may comprise marketing and/or other indicia. In another example (which example is intended to be illustrative and not restrictive), End Cap 603*b* may include Protrusion 903 which may be adapted for cleaning teeth and/or gums.

Figure 10:
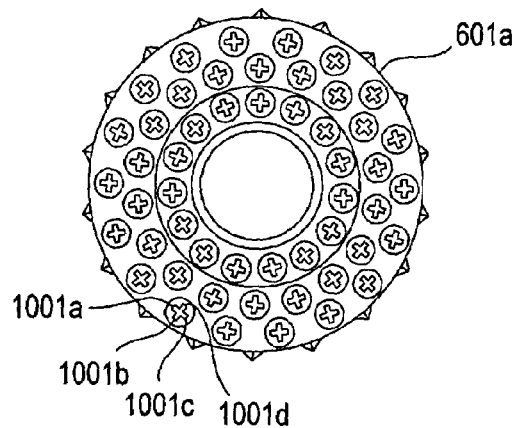
FIG. 10 shows an end view of Disk 601a (depicting one face)

Referring now to FIG. 10, an end view of Disk 601*a* (depicting one face) is shown. As seen in this FIG. 10, the Scrubbing Nubs (including associated Scrubbing Tips) may be arranged in rows. In one example (which example is intended to be illustrative and not restrictive), there may be three rows arranged in an offset pattern. Of course, the other face of Disk 601*a* (as well as the faces of the other Disks) may have similarly arranged Scrubbing Nubs and Scrubbing Tips. In another example (which example is intended to be illustrative and not restrictive), each of Scrubbing Nubs 605 may include four Scrubbing Tips 1001*a*, 1001*b*, 1001*c*, and 1001*d* (of note, only one set of Scrubbing Tips 1001*a*–1001*d* is individually identified in FIG. 10).

In operation, the embodiments of the chew described with reference to FIGS. 1–5 and FIGS. 6–10 may operate as follows: Each disk has a hub to provide a space between adjacent disks so that the pet's tooth may easily penetrate as the disks flex open (allowing the scrubber tips and/or the scrubber nubs to contact the tooth surface and/or the gum). As the pet continues to chew, the disks repeatedly open, flex, and turn (allowing the scrubbing tips and/or scrubber nubs to move over the tooth's surface and/or the gum).

In another embodiment, the present invention provides an interactive chew and method that may help clean the teeth and/or gums of a pet.

In another embodiment, the present invention provides a chew and method which may aid in the removal of tartar, plaque, and/or trapped food particles.

In another embodiment, the present invention provides a chew and method which may aid in stimulating and/or massaging gums, preventing (or minimizing) gingivitis and/or periodontal disease, preventing (or minimizing) bad breath, and/or satisfying the pet's chewing instinct.

In another embodiment, the present invention provides a chew and method in which the rotating elements (e.g., the disks) may be made from any material safe for pets (e.g., dogs and/or cats) which can sustain the proper shape and move in the way necessary to perform the functions described herein (e.g., any "rubber-type" material). Such materials include but are not limited to rubber, both natural and synthetic and combinations thereof, polyurethane, vinyl and other plastics.

In another embodiment, the present invention provides a chew and method in which the End Caps and the Shaft may be of any material safe for pets (e.g., dogs and/or cats) which is durable enough to support the functions described herein. Such materials include but are not limited to rubber, both natural and synthetic and combinations thereof, polyurethane, vinyl and other plastics.

In another embodiment, the present invention provides a chew used in a generally horizontal aspect (e.g., with the disks parallel to the teeth).

In another embodiment, the present invention provides a chew used in a generally vertically aspect (e.g., with the disks perpendicular to the teeth).

In another embodiment, the present invention provides a chew including means for dispensing tooth cleaning agents (such as tooth paste) and/or medicines (e.g., from a reservoir in the interior of a chew onto one or more surfaces on the exterior of the chew.

In another embodiment, the present invention provides a chew with adjustable disk spacing (e.g., to permit customization based upon size and/or breed of the pet using the chew).

In another embodiment, the present invention provides a toy for chewing and/or for playing.

In another embodiment, the present invention provides a chew and method which nearly assure proper biting and/or chewing (along with the subsequent scrubbing function).

In another embodiment, the present invention provides a dental device that has strong appeal to a pet as a chew toy. The chew toy may comprise a series of flexible disks that open, turn, and flex on and around the pet's teeth and/or gums, making contact with scrubbing tips on scrubber nubs (whereby the contacted surfaces are cleansed).

Figure 11:
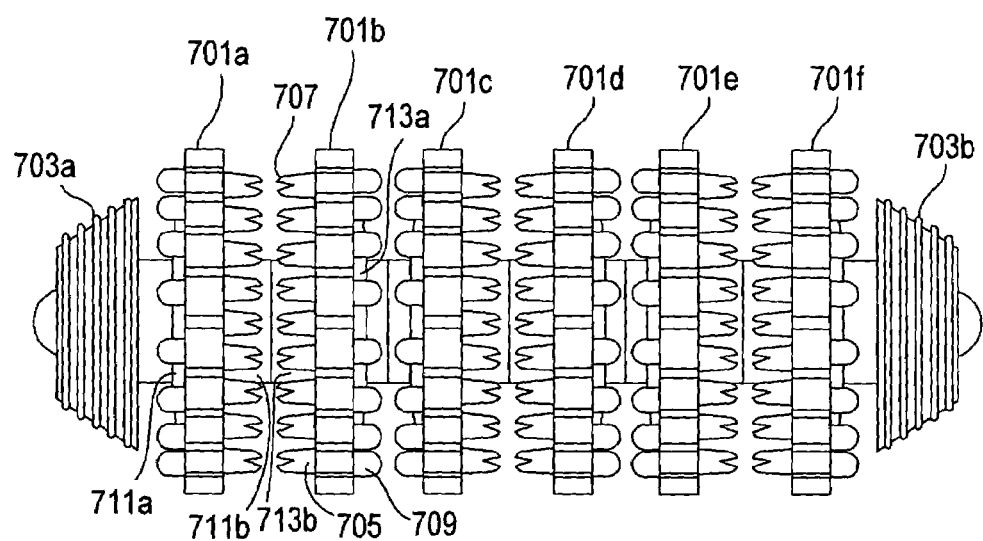
FIG. 11 shows a side view of a six-disk pet chew according to another embodiment of the invention.

Referring now to FIG. 11, a side view of a six-disk pet chew according to another embodiment of the present invention as show. As seen in FIG. 11, disk 701a, disk 701b, disk 701c, disk 701d, disk 701e and disk 701f are mounted rotatably relative to one another on a shaft (not shown). End cap 703a and end cap 703b are used to retain disks 701a–701f on the shaft.

Still referring to FIG. 11, a plurality of scrubbing nubs 705 (only one of which is individually identified in FIG. 1) protrude from the same face of each of disks 701a–701f. In addition, scrubbing tips 707 (only one of which is individually identified in FIG. 11) protrude from each scrubbing nub 705. On the other side of each of disks 701a–701f, a plurality of scrubbing nubs 709 (only one of which is individually identified in FIG. 11) protrude therefrom.

As shown in FIG. 1, disk 701a has a hub 711a formed on one face and hub 711b formed on the other face. Likewise, disk 701b has hub 713a formed on one face and hub 713b formed on the other face such that scrubbing nubs 705 of disks 701a and 701b face one another as shown.

Figure 12:
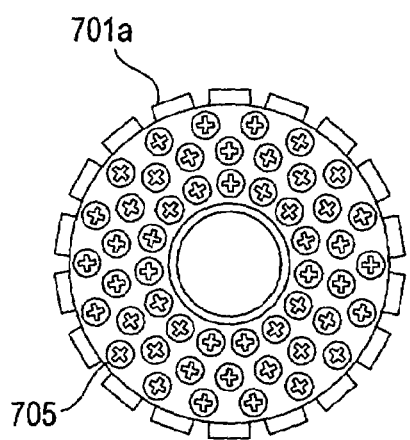
FIG. 12 is an end view of disk 701a (depicting one face)
Figure 13:
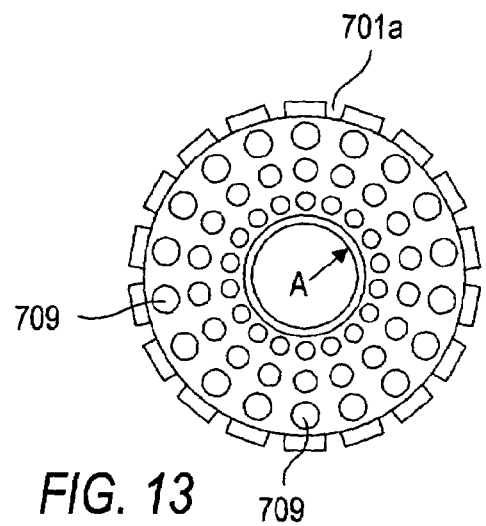
FIG. 13 is an end view of disk 701a (depicting the other face)

Referring now to FIG. 12, a first end view of disk 701a (depicting one face) is shown. As seen, scrubbing nubs 705 (including associated scrubbing tips) are arranged in rows. In this example (which is intended not to be illustrative nor restrictive), there are three rows arranged in an offset pattern. The other face of disk 101a as well as the other faces of the other disks will have a similarly arranged pattern of nubs 709.

Figure 14:
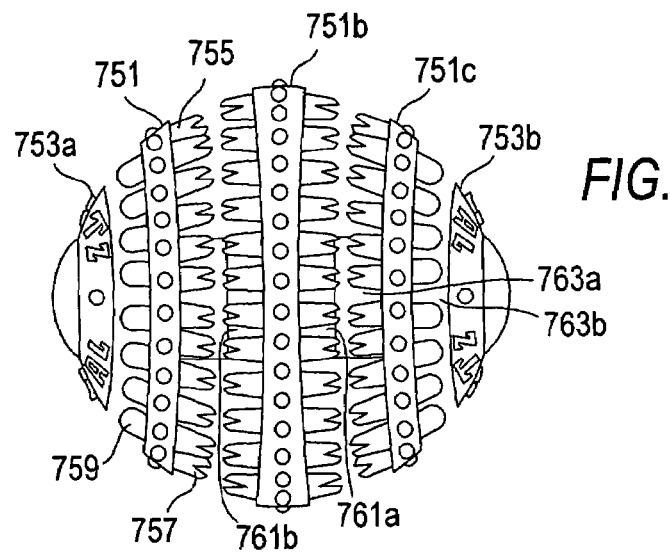
FIG. 14 shows a side view of a ball shaped pet chew in accordance with the invention.

Turning now to FIG. 14, a side view of a three-disk pet chew according to yet a further embodiment of the present invention as shown. As seen in FIG. 14, the pet chew has a ball-shaped configuration and comprises side disk 751a, central disk 751b and side disk 751c, which are mounted rotatably relative to one another on a shaft (not shown). End cap 753a and end cap 753b are used to retain disks 751a–751c on the shaft.

Still referring to FIG. 14, a plurality of scrubbing nubs 755 (only one of which is individually identified in FIG. 14) protrude from one of the faces of each of disks 751a–751c. In addition, scrubbing tips 757 (only one of which is individually identified in FIG. 14) protrude from each scrubbing nub 755. On the other face of central disk 751b, a plurality of scrubbing nubs 755 having scrubbing tips 757 also protrude. On the two end disks 751a and 751c, the side which face end caps 753a and 753b have a plurality of nubs 759 depending therefrom.

Continuing with FIG. 14, central disk 751b has hub 761a formed on one face and hub 761b formed on the other face. Side disks 751a and 751c have hubs 763a formed on one face and hub 763b formed on the other face.

Figure 15:
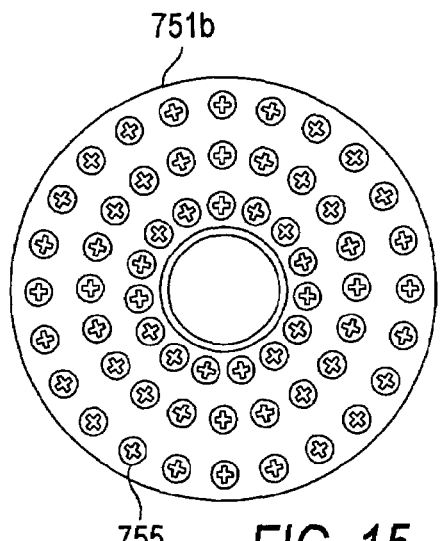
FIG. 15 is an end view of central disk 751b (depicting one face)

Referring now to FIG. 15, an end view of central disk 751b (showing one face) is shown. As shown, scrubbing nubs 755 (including associated scrubbing tips) are arranged in three circular rows in an offset pattern or arrangement. The other face of disk 751b (not shown) will have similarly arranged scrubbing nubs and scrubbing tips.

Figure 17:
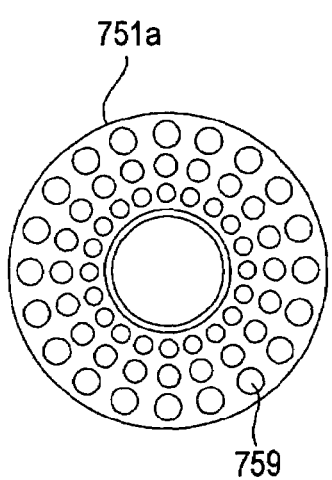
FIG. 17 is a side view of side disk 751a (depicting the other face).
Figure 16:
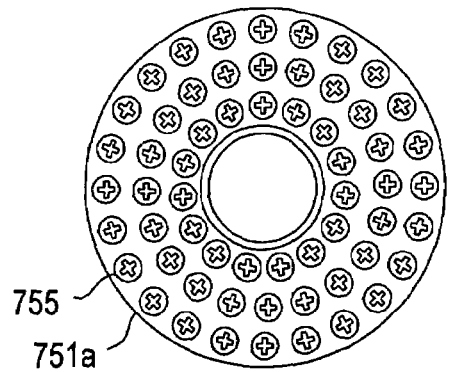
FIG. 16 is an end view of side disk 751a (depicting one face)

In FIG. 16, an end view of side disk 751a is show (depicting the face which faces disk 751b). As shown, the plurality of scrubbing nubs 755 is arranged in a circular offset pattern that corresponds with the pattern depicted on the faces of disk 751b. FIG. 17 is an end view (depicting the other face) of disk 751a and illustrates the arrangement of plurality of nubs 759.

In another embodiment the present invention provides scrubbing tips that flex and move on a tooth's surface (and/or the surface of a gum), nubs that bend and apply pressure (directly and/or through the scrubbing tips) to contact the tooth (and/or the gum), disks that flex open to allow the tooth to penetrate into the device and turn the disks (to help move the scrubbing nubs and/or the scrubbing tips across the tooth surface (and/or the gum) to provide superior tooth cleaning).

In another embodiment the present invention provides for the moving (i.e., scrubbing) action of the scrubbing tips (as well as the reverting to shape of the scrubbing tips); the placement of the scrubbing nubs to come into contact with the surface of the teeth (and/or the gum) and then to flex and revert to position; and the flexing and turning of the disks. Of note, each of the aforementioned elements may be designed to provide an appropriate resistance to these movements to cause a proper reverting to shape.

In accordance with the invention, the number of disks for the inventive pet chew may range from between 1 and 16, and the number of rows of scrubbing elements for each disk is from 1 to 16.

While a number of embodiments of the present invention have been described, it is understood that these embodiments are illustrative only, and not restrictive, and that many modifications may become apparent to those of ordinary skill in the art. For example, the End Caps may be held on the Shaft using glue, fasteners, a "screw-on" arrangement (i.e., the End Caps may be screwed on to the shaft), and/or a "press" (i.e., interference) fit. Further, the pet chew according to the present invention may be assembled by hand, using automated machinery, or a combination thereof. Further still, the pet chew may be colored, scented, and/or flavored as desired (e.g., to appeal to a pet owner and/or pet in terms of smell and/or taste and/or visual appearance: Further still, the Hubs may comprise independent elements disposed on the Shaft between various Disks and/or End Caps (each Hub may be freely rotating on the Shaft or fixed to the Shaft). Further still, spacing between Disks and/or End Caps may be maintained by a single Hub associated with one of two adjacent Disks and/or End Caps. Further still, the Raised Portions of the End Caps may comprise scrubbing elements for scrubbing teeth and/or gums. Further still, the rotating elements may take any desired form (e.g., any desired diameter, thickness, cross-section, and/or shape). Further still, the pattern of the Scrubber Nubs could be any desired pattern. Further still, the Scrubbing Tips may take any desired form (e.g., one or more individual Scrubbing Tips in any desired pattern on the Scrubbing Nubs). Further still, it is to be understood that the termis "obverse" and "reverse" are used herein to denote different sides of an object, without imparting any significance, importance, or precedence to either term relative to the other.

The invention claimed is:

1. A pet chew, comprising:
a shaft;
a first member rotatably mounted on said shaft around an axis of rotation;
a second member rotatably mounted on said shaft around said axis of rotation;
a plurality of scrubbing elements collectively mounted on a first substantial planar surface of the first member;
a plurality of scrubbing elements collectively mounted on a substantial first planar surface of the second member;
wherein the first surface of the first member and the first surface of the second member are generally perpendicular to the axis of rotation;
wherein said first surface of said first member and said first surface of said and second member completely face each other; and
a hub associated with at least one of said members and dimensioned to space said members axially to maintain a selected distance between said members during rotation.

2. The pet chew of claim 1, wherein the hub comprises a raised portion of at least one of the first surface of the first member and the first surface of the second member.

3. The pet chew of claim 1, further comprising retaining means for retaining the first member and the second member on the shaft.

4. The pet chew of claim 1, wherein the first member is a first circular disk and the second member is a second circular disk.

5. The pet chew of claim 4, further comprising at least one additional scrubbing element mounted on at least one of: (a) an outer circumferential surface of the first disk; and (b) an outer circumferential surface of the second disk.

6. The pet chew of claim 4, wherein said scrubbing elements are mounted in circular rows along said surfaces.

7. The pet chew of claim 1, wherein each of the scrubbing elements is adapted to scrub at least one of: (a) a tooth; and (b) a gum.

8. The pet chew of claim 1, wherein the scrubbing elements are mounted on said surfaces of said members in rows.

9. The pet chew of claim 8, wherein the scrubbing elements are mounted in offset rows.

10. The pet chews of claim 1, wherein the scrubbing elements mounted on said first surface of the first member are in facing relationship to the scrubbing elements mounted on the first surface of the second member.

11. The pet chews of claim 1 wherein each said scrubbing element includes a nub terminated with a tip.

12. The pet chews of claim 11 wherein said tip is conical.

13. The pet chews of claim 11 wherein said nub is split into a plurality of coextensive tips.

14. The pet chews of claim 13 wherein said nub and tips extend radially.

15. A pet chew, comprising:
a plurality of circular disks, wherein each of the disks includes a substantially flat obverse surface, a substantially flat reverse surface, and an outer circumferential surface;
means for mounting the disks in a rotatable orientation, wherein the disks are rotatable relative to one another around an axis of rotation substantially perpendicular to both the obverse surface and reverse surface of each said disk;
a plurality of scrubbing elements mounted on at least one of the obverse surface and the reverse surface of each disk;
wherein the obverse surfaces of each said disk completely face each other; and
a hub associated with one of said discs and positioned to space said discs at a predetermined distance from each other.

16. The pet chew of claim 15, wherein the means for mounting includes a shaft.

17. The pet chew of claim 16, wherein each disk is mounted on the shaft.

18. The pet chew of claim 16, further comprising retaining means for retaining the disks on the shaft.

19. The pet chew of claim 15, wherein said hub is disposed between one of the obverse surface and the reverse surface of one disk and one of the obverse surface and the reverse surface of another disk.

20. The pet chew of claim 15, wherein said hub is formed of a raised portion of at least one of the obverse surface and the reverse surface of one disk.

21. The pet chew of claim 15, further comprising at least one additional scrubbing element mounted on the outer circumferential surface of at least one of the disks.

22. The pet chew of claim 15, wherein each of the scrubbing elements is adapted to scrub at least one of: (a) a tooth; and (b) a gum.

23. The pet chew of claim 15, wherein the number of disks is in the range of 1 to 16.

24. The pet chew of claim 15, wherein the scrubbing elements mounted on at least one of the obverse surface and the reverse surface of at least one disk are mounted in circular rows.

25. The pet chew of claim 24, wherein the scrubbing elements in at least one row are offset from the scrubbing elements in at least another row.

26. The pet chew of claim 24, wherein the number of rows is in the range of 1 to 16.

27. The pet chew of claim 15, wherein said plurality of circular disks define a ball shaped configuration.

28. The pet chews of claim 15, wherein the obverse surface of one of said disks has said plurality of scrubbing elements mounted in a substantially facing relationship to said plurality of scrubbing elements mounted on the reverse surface of another of said disks.

29. A method of providing dental care to a pet having teeth, comprising:
 mounting a first member of a pet chew and a second member of the pet chew in a rotatable orientation, wherein the first member and the second member are rotatable relative to one another around an axis of rotation;
 collectively mounting a plurality of scrubbing elements on a first substantially planar surface of the first member; and
 collectively mounting a plurality of scrubbing elements on a first substantially planar surface of the second member;
 wherein the first surface of the first member and the first surface of the second member are generally perpendicular to the axis of rotation and wherein said surfaces completely face each other; and
 wherein movement, during chewing of the pet chew by the pet, by at least one tooth of the pet against at least one of: (a) at least one of the scrubbing elements; (b) the first member; and (c) the second member causes the first member and the second member to rotate relative to one another, said members being spaced from each other at a predetermined distance selected to insure that during chewing, said tooth fits between and is cleaned by said two members.

30. A method of providing dental care to a pet having teeth, comprising:
 mounting a plurality of circular disks in a rotatable orientation, wherein the disks are rotatable relative to one another around an axis of rotation, said circular discs being spaced from each other by a hub to maintain a predetermined distance between said disks during rotation; and
 mounting a plurality of scrubbing elements on at least one of a substantially flat obverse surface and a substantially flat reverse surface of each disk, the obverse and reverse surfaces of each said disk being substantially perpendicular to said axis of rotation and said obverse surfaces completely facing one another;
 wherein movement, during chewing of the pet chew by the pet, by at least one tooth of the pet against at least one of: (a) at least one of the scrubbing elements; and (b) at least one of the disks causes the disks to rotate relative to one another.

* * * * *